US011754395B2

(12) United States Patent
Joet et al.

(10) Patent No.: US 11,754,395 B2
(45) Date of Patent: Sep. 12, 2023

(54) COUPLING DEVICE INTENDED TO COUPLE TWO ELEMENTS IN MOVEMENT

(71) Applicant: COMMISSARIAT A L'ENERGIE ATOMIQUE ET AUX ENERGIES ALTERNATIVES, Paris (FR)

(72) Inventors: Loïc Joet, Grenoble (FR); Patrice Rey, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 99 days.

(21) Appl. No.: 17/445,745

(22) Filed: Aug. 24, 2021

(65) Prior Publication Data
US 2022/0065630 A1 Mar. 3, 2022

(30) Foreign Application Priority Data

Aug. 27, 2020 (FR) ...................................... 20 08733

(51) Int. Cl.
*G01C 19/5663* (2012.01)
(52) U.S. Cl.
CPC ................................. *G01C 19/5663* (2013.01)
(58) Field of Classification Search
CPC ............................................... G01C 19/5663
See application file for complete search history.

(56) References Cited

U.S. PATENT DOCUMENTS

| | | | |
|---|---|---|---|
| 8,322,213 B2* | 12/2012 | Trusov | G01C 19/5747 73/504.12 |
| 9,217,756 B2* | 12/2015 | Simon | G01C 19/5621 |
| 2012/0279300 A1* | 11/2012 | Walther | G01C 19/5747 73/504.03 |
| 2016/0370182 A1* | 12/2016 | Shao | G01C 19/5769 |
| 2018/0172446 A1* | 6/2018 | Prikhodko | G01C 19/567 |

OTHER PUBLICATIONS

French Preliminary Search Report dated May 30, 2021 in French Application 20 08733 filed on Aug. 27, 2020, 2 pages (with English Translation of Categories of Cited Documents).

* cited by examiner

*Primary Examiner* — Paul M. West
*Assistant Examiner* — Mark A Shabman
(74) *Attorney, Agent, or Firm* — Oblon, McClelland, Maier & Neustadt, L.L.P.

(57) ABSTRACT

A mechanical coupling device coupling in movement two elements able to move in translation along a first direction, configured to impose thereon movements in phase opposition, the coupling device including two arms rotationally articulated about a second out-of-plane direction, each arm to be connected to one of the movable elements, a coupling element to which the two arms are connected by elements having high rigidity in a third direction, the coupling element being configured to move in translation along the third direction, first and second devices for suspending the coupling element configured to guide the coupling element in translation along the third direction and to limit rotational movement thereof about the second direction.

14 Claims, 6 Drawing Sheets

COUPLING DEVICE INTENDED TO COUPLE TWO ELEMENTS IN MOVEMENT

TECHNICAL FIELD AND PRIOR ART

The present invention relates to a coupling device intended to couple two elements in movement and a gyrometer using at least one such coupling device.

Microelectromechanical gyrometers or MEMS (microelectromechanical system) gyrometers include a support, two movable masses suspended from the support each by a decoupling frame, means for exciting the masses generally in the plane, and means for detecting the movement of the masses.

For example, when it is wished to detect the speed of rotation in the direction Z outside the plane, each mass with its decoupling frame is excited in the direction X, and the movement of the masses in the direction Y is measured.

The decoupling frames and the masses have in excitation two distinct resonant modes, a resonant mode wherein the two masses and the two decoupling frames have a movement in phase, i.e. they move in the same direction, and a resonant mode wherein the masses and the decoupling frames have a movement in phase opposition or in antiphase, i.e. they move in opposite directions. The movement of the masses in antiphase makes it possible to make differential measurements separating the useful signal from the effect of any acceleration or gravity.

The antiphase resonant mode is the useful mode and the in-phase resonant mode is the non-useful mode for the gyrometer.

However, the non-useful mode has a lower resonant frequency than that of the useful mode. It is desirable for the useful resonant mode to be excited at a lower frequency than that of the non-useful mode.

More generally it is desirable to offer a device for coupling between two elements in movement, favouring a symmetrical movement of the elements with respect to each other.

DESCRIPTION OF THE INVENTION

Consequently one aim of the present invention is to offer a coupling device intended to couple two elements in movement, the elements being able to be movable in translation and/or in rotation.

Another aim of the present invention is to offer a gyrometer having an antiphase excitation mode at a lower frequency than that of the in-phase excitation mode.

The aim stated above is achieved by a coupling device including a symmetry plane normal to the plane of the coupling device, and including two levers articulated in rotation on a support about an out-of-plane direction, each lever including a first end intended to be connected respectively to one of the two elements movable with respect to each other, and a second end by means of which the lever is articulated in rotation, a coupling element connected to the two levers and configured to move in translation in a direction of the plane, said coupling element being connected to the support by one or more anchoring studs and springs providing a movement in translation in said direction of the plane while preventing rotation about the out-of-plane direction. The two movable elements connected by the coupling device then have movements symmetrical with respect to the symmetry plane.

The levers are constrained to pivot symmetrically with respect to each other, this movement being allowed by the movement in translation of the coupling element. Movements of the levers that are not symmetrical with respect to each other is prevented, these movements being prevented by the fact that the movement in rotation of the coupling element is greatly limited.

Two coupling devices are advantageously used in a gyrometer and connect the decoupling frames. The in-phase mode is rejected to higher frequencies, and the gyrometer then has a frequency of its antiphase excitation mode or useful mode lower than that of its in-phase excitation mode or non-useful mode. The excitation means, by exciting the decoupling frames at the frequency of the antiphase mode, excite the non-useful mode less. The operation of the gyrometer is then improved.

Highly advantageously, the gyrometer includes means for detecting the movement of the decoupling frames, which comprise at least one strain gauge. A reduction device is preferably provided between at least one coupling device and the strain gauge. This is because the movement of the decoupling frames is of the order of one thousand times that which a strain gauge can withstand.

The reduction device includes for example in series lever arms which, combined with the decoupling device, which already offer a reduction of the movement, make it possible to obtain a movement adapted to the strain gauge.

One subject-matter of the present application is then a mechanical coupling device intended to couple two elements able to move in movement in a first plane, so as to impose thereon symmetrical movements with respect to a second plane normal to the first plane, said coupling device including two arms articulated in rotation about a first out-of-plane direction, each arm being intended to be connected to one of the movable elements by first elements having high rigidity in a second direction of the first plane, a coupling element to which the two arms are connected by second elements having high rigidity in a third direction of the first plane, said coupling element being configured to move in translation along the third direction, means for suspending said coupling element configured for guiding the coupling element in translation along the third direction and limiting its movement in rotation about the first direction.

Another subject-matter of the present invention is a gyrometer including a support, two decoupling frames suspended from the support so as to be able to move in translation in the second direction, a mass suspended from each decoupling frame, so as to be able to move in translation in the third direction, at least one coupling device according to the present application, mechanically connecting the two decoupling frames so as to impose thereon a movement in phase opposition in the second direction, means for exciting the decoupling frames in the second direction and means for detecting the movement of the masses in the third direction.

BRIEF DESCRIPTION OF THE DRAWINGS

The present invention will be understood better on the basis of the following description and the accompanying drawings, on which.

DETAILED DESCRIPTION OF PARTICULAR EMBODIMENTS

In the present application, "blade" means an element extending in a longitudinal principal direction, having high compressive stiffness for transmitting movement in the principal direction of the blade, and low bending stiffness to allow the orthogonal movements due to the rotation or rotations at each end. "An element having high compressive stiffness in a direction or high rigidity in a direction" means an element that deforms little or not at all in this direction under the effect of forces of normal intensities in MEMS.

In the following description, the coupling device is described more particularly in a use in a gyrometer. It will be understood that it can be used in another system requiring such coupling. For example, the coupling device can be used in a sensor to make it symmetrical and thus to make it insensitive to acceleration. For example, gravity tends to move the sensitive elements of the sensor in the same direction, and the coupling device allows only differential movement. This applies to the magnetic sensor.

The coupling device according to the invention can also be used for coupling two sensors. For example, if the latter emit the same signals, they cancel each other out, otherwise the difference between the signals is detected. This applies for example to a magnetic-gradient sensor.

Figure 1:
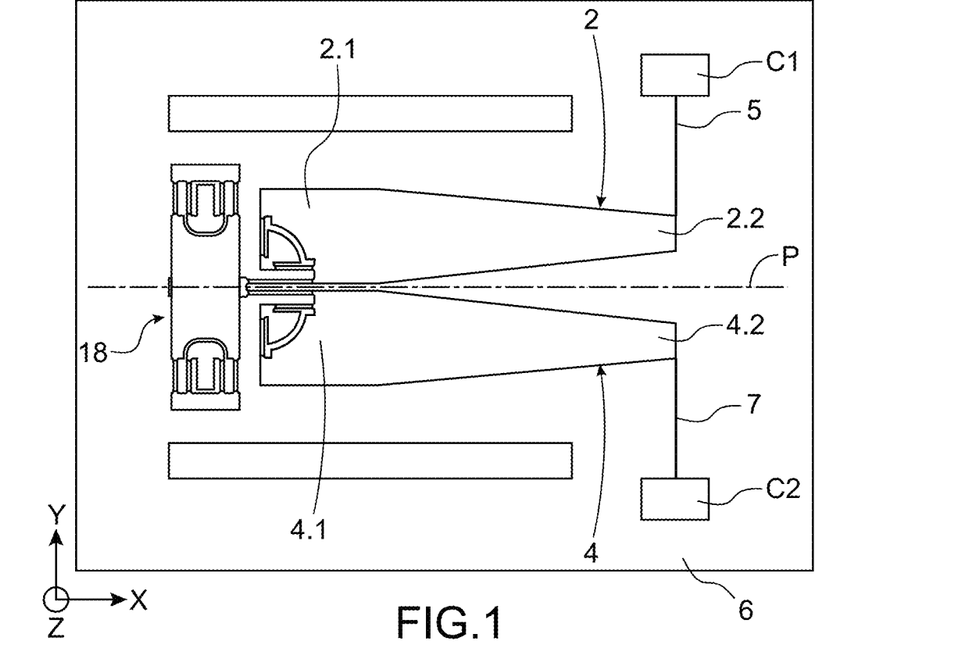
FIG. 1 is a plan view shown schematically of an example of a coupling device.

In FIG. 1, an example of a device for coupling between two elements C1, C2 able to move in translation in a direction Y can be seen shown schematically, typically it is a case of decoupling frames used in a gyrometer.

The coupling device lies in a plane XY and the direction normal to this plane is the direction Z designated the out-of-plane direction.

The plane XY is considered to be the plane of the coupling device, this is the plane wherein the various elements of the coupling device and coupled elements move in translation and/or in rotation.

The coupling device DC has a symmetry plane P normal to the plane XY.

The coupling device includes two arms 2, 4 disposed on either side of the plane P, each arm 2, 4 is articulated in rotation on a support 6 by a first longitudinal end 2.1, 4.1 about an out-of-plane direction Z1, Z2 respectively. Each arm 2, 4 is intended to be connected to an element C1, C2 by its second longitudinal end 2.2, 4.2.

The arms 2, 4 are such that they do not deform or deform only a little in flexion at the force values conventionally applied in MEMS systems. They have great transverse rigidity. In the example shown, the arms have a large transverse dimension in the direction Y providing the rigidity. Preferably the arms 2, 4 have a shape tapered towards the second end thereof, making it possible to reduce inertia, to leave space for the movements between the arms in order to avoid collisions, and to reduce viscous damping, also called squeeze film damping between the arms 2, 4.

Each second longitudinal end 2.2, 4.2 is connected to an element C1, C2 by a blade 5, 7 extending along the axis Y and offering great rigidity along this axis to transmit its movement. The blades 5, 7 offer low stiffness in flexion along X, making it possible to make the translation movement of the elements C1, C2 and the rotation movement of the arms 2, 4 coexist.

The device includes, for each arm, a rotation articulation or pivot connection 8, 10 between the first longitudinal end 2.1, 4.1 and the support 6.

The two articulations are identical or similar, only the articulation 8 will be described in detail.

Figure 2:
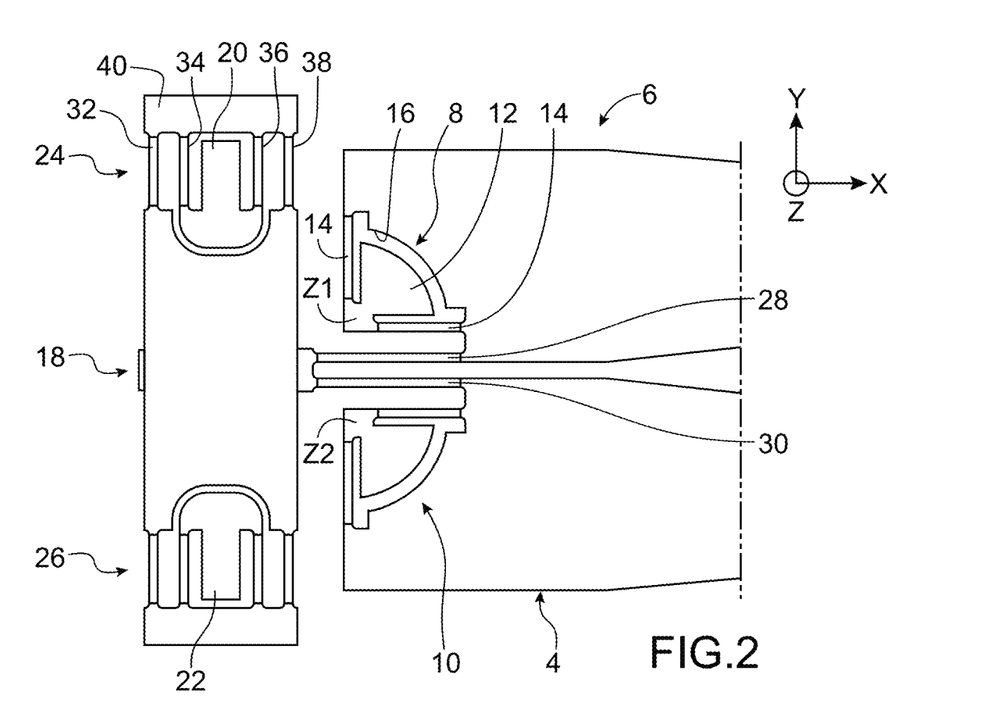
FIG. 2 is a detail view of the device of FIG. 1.

The rotation articulation 8 includes a stud 12 for anchoring to the support 6 and two blades 14 connected between the anchoring stud 12 and the arm 2. The beams are oriented with respect to each other at an angle of 90°. In this example, the anchoring stud is substantially in the form of a quarter of a disc and the blades 14 extend from the top of the anchoring stud 12 parallel to the edges thereof to connect to the lever. In this example, the lever includes a window 16 with a shape corresponding to the external shape of the anchoring stud, wherein the anchoring stud is housed. Advantageously, the lever of the beams and the anchoring stud are produced in a single piece by etching in one or more layers. This embodiment has a high level of integration and reduced overall size for the assembly consisting of arm and pivot articulation. Other embodiments of the pivot connections can be envisaged. In this example, the blades 14 are perpendicular. In a variant, the blades 14 are not perpendicular. In a variant again, the articulation 8 includes two secant blades connected to the arm 2 at their point of intersection, and each blade is anchored to the support by an anchoring stud.

Each arm can therefore pivot about its axis Z1, Z2 substantially placed at the intersection of the two blades 14.

The coupling device also includes a coupling element 18 coupling the two arms 2, 4. The coupling element 18 will be referred to as a "carriage" in the remainder of the description.

The carriage 18 is suspended from the support 6 by two anchoring studs 20, 22 disposed on either side of the carriage in the direction Y and by first and second suspension means 24, 26 between the carriage and the anchoring studs. The suspension means allow a translation movement of the movable element along a direction X in the plane and orthogonal to the direction Y, and very greatly limiting or even preventing movement in the direction Y and therefore rotation of the coupling element about the out-of-plane direction.

An advantageous example embodiment of the first and second suspension means 24, 26 will be described in detail below.

The two arms 2, 4 are mechanically connected to the carriage 18 by means 28, 30 offering great rigidity in the direction X and providing strong coupling in the direction X. In this example the means 28, 30 each include a blade extending in the direction X. The high compressive stiffness along X of the beams makes it possible to transmit the movement to the arms 2, 4. The blades 28, 30 have low stiffness in flexion in the direction Y, which makes it possible to make the translation movement of the carriage 18 coexist with the rotation movement of the arm 2, 4. Preferably, the centre of each blade 28, 30 is aligned with the points of intersection of the axes Z1, Z2 and of the plane XY, and thus the deformation of the blades 28, 30 is close to a pure bending, thus opposing a highly reduced stiffness in the direction Y.

The first and second suspension means 24, 26 are such that they provide the translational guidance of the carriage 18 along the direction X. The first and second suspension means 24, 26 are similar, only the first suspension means 24 will be described in detail.

The first suspension means 24 include two pairs of beams 32, 34 and 36, 38 and a connection element 40. The beams are parallel to each other and to the direction Y. A pair of beams 32, 34 is disposed on one side of the anchoring stud 20 and the other pair of beams is disposed on the other side of the anchoring stud 20 looking in the direction X.

The connection element 40 extends along the direction X.

The beams 32, 34 and 36, 38 include a longitudinal end attached to the connection element 40. The second end of the beams 34 and 36 is attached to the anchoring stud 20. The second longitudinal end of the beams 32 and 38 is attached to the carriage 18.

The connection element 40 is rigid enough in the direction Y for the deformations thereof to be negligible under the forces commonly applied in MEMS systems. The coupling of the pairs of beams 32, 34 and 36, 38 by the connection element 40 ensures that the stiffness in the direction Y is not reduced.

The two beams 32, 34 and 36, 38 of each pair connected by the connection element form a spring with two reversals improving the linearity of the guidance means. This is because the beams of each pair having similar mechanical behaviours, during the movement of the carriage in the direction X, the amplitudes of the deformations of each beam along Y, which are non-linear, are similar, the deformations at least partly compensate for each other. The non-linear behaviour of the articulation is then greatly reduced. Moreover, the connection between the pairs 32 and 34 being shared by the pair 36 and 38, the loss of stiffness in the direction Y that could be caused by the use of a folding is cancelled. In a variant, the first and second suspension means each include two beams, each being connected to a top of the carriage and to an anchoring stud, the anchoring stud being able to be common or not.

Thus the carriage 18 is suspended from the movable elements 40 by four springs, which guide it in the direction X, greatly limiting its movement in the direction Y and also limiting the rotation of the coupling element about the out-of-plane direction Z.

In the example shown, the first and second suspension means have their own anchoring stud. In a variant, a single anchoring stud is used for the first and second suspension means.

The operation of the coupling device will now be described.

Figure 3:
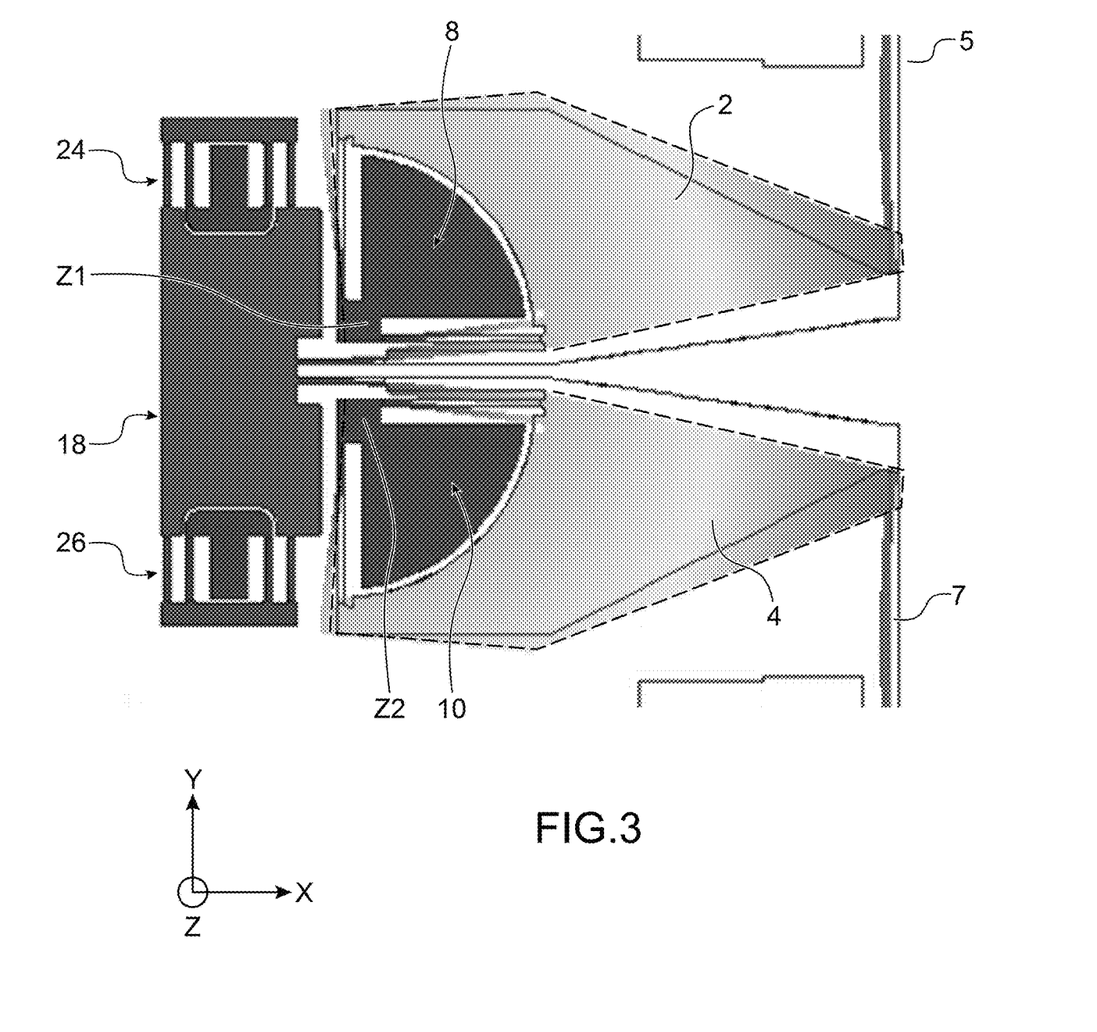
FIG. 3 is a schematic representation of the coupling device of FIG. 1 set in motion in an authorised movement.

When the two arms 2, 4 pivot (shown in broken lines) about the axes Z1, Z2 respectively in opposite directions, one rotating in the clockwise direction and the other rotating in the anticlockwise direction, i.e. in phase opposition (FIG. 3), the beams 28, 30, rigid in the direction X, exert two forces in the same direction on the carriage 18 along the direction X. The carriage is enabled to move in the direction X by the suspension means 24, 26. The carriage 18 moves towards the left in the representation in FIG. 1 when the arms 2, 4 move towards each other, and move towards the right when the arms 2, 4 separate from each other. The movements of the arms 2, 4 in phase opposition are therefore enabled and therefore those of the elements C1, C2 to which they are connected.

When the arms 2, 4 pivot in phase about the axes Z1, Z2, i.e. either in the clockwise direction or in the anticlockwise direction, the beams 28, 30 exert two opposite forces on the carriage 18, which tends to pivot about the out-of-plane direction Z. However, the suspension means 24, 26 oppose high stiffness to such a rotation. As a result the in-phase rotation movements of the arms are greatly limited.

The translation movements in phase opposition of the decoupling frames secured to the levers are favoured and those in phase are greatly limited.

It should be noted that the coupling device has a reduction effect between the amplitude AY of movement of the ends of the levers 2.2, 4.2 along the direction Y, and the amplitude of movement AX of the coupling element along the direction X, the latter is substantially reduced compared with the amplitude AY. This is because the arms 2, 4 form $1^{st}$ class levers, i.e. in which the fulcrum is between the effort and the resistance.

The reduction in the amplitude of movement reduces the non-linearities and the stresses in the carriage suspension means. This is because AY may attain 5 μm to 10 μm in the case of a gyrometer.

Figure 4A:
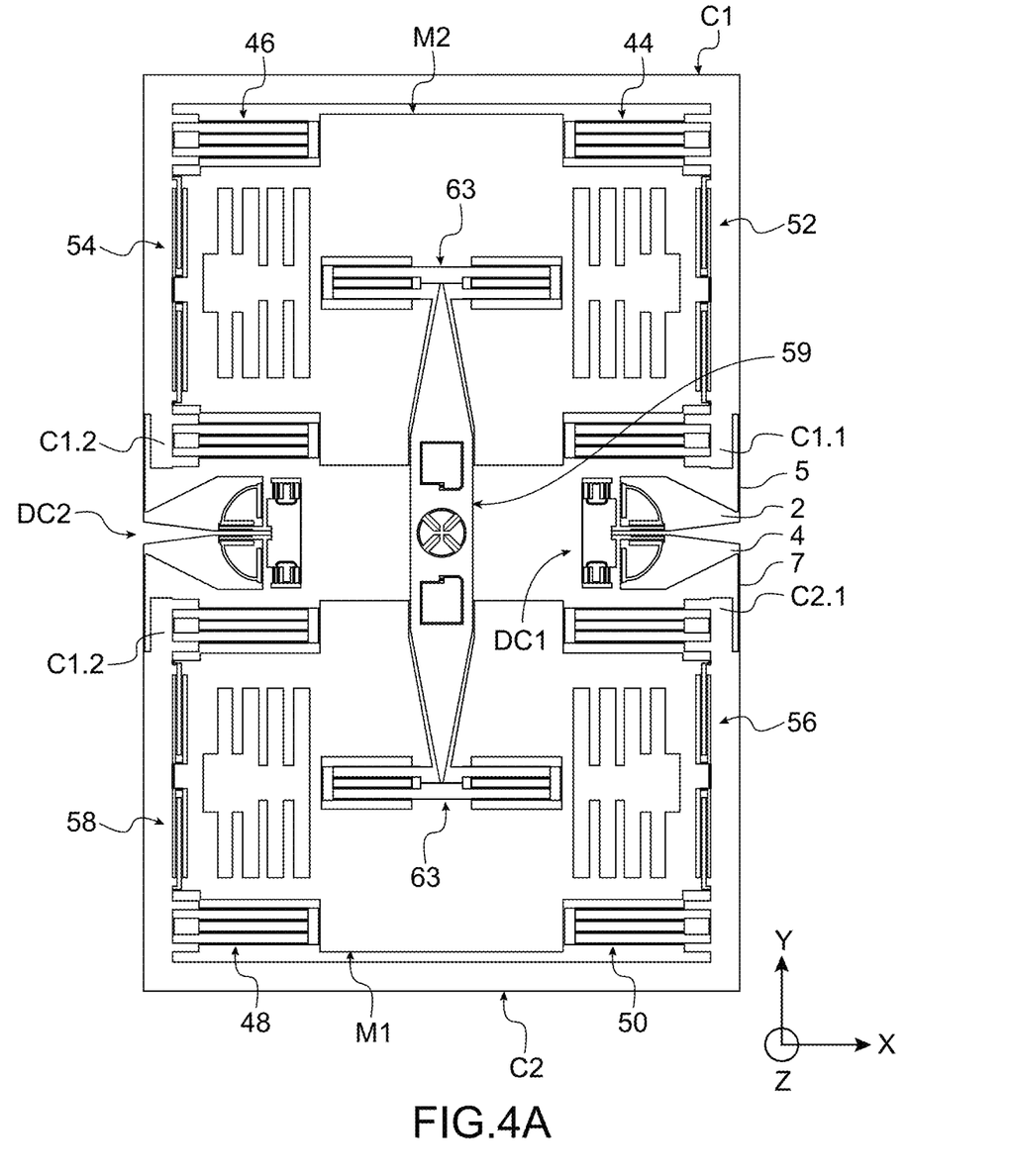
FIG. 4A is a plan view of a gyrometer including two coupling devices of FIG. 1.

FIG. 4A shows a plan view of an example of a single-axis gyrometer, detecting rotation about Z, using two coupling devices DC.

The gyrometer includes a support 42, and two decoupling frames C1, C2 suspended on the support, each by suspension means 44, 46 and 48, 50.

The suspension means are advantageously of the same type as the suspension means 24, 26. They have a reduced non-linear behaviour and provide the translational guidance of the frames in the direction Y. In a variant, the suspension means are formed by other types of spring, for example of the coil type.

Each frame is in the form of a U, the two frames being disposed with respect to each other so that the free ends C1.1, C1.2 and C2.1, C2.2 of the arms are aligned two by two. The aligned free ends are each connected to one end 2.2, 4.2 of an arm 2, 4 of a coupling device.

The free ends C1.1, C1.2 and C2.1, C2.2 of the frames and the ends 2.2, 4.2 of the arms 2, 4 are connected by rigid elements 5, 7 in the direction Y of movement of the frames, for example beams extending in the direction Y and offering strong coupling in this direction, such as those described in relation to FIG. 1.

Thus the two decoupling frames are mechanically connected by the two coupling devices DC1, DC2 and the relative movements thereof are controlled by the coupling devices DC1, DC2.

The gyroscope also includes two masses M1, M2, each suspended in a decoupling frame C1, C2 by suspension means 52, 54, 56, 58. Advantageously, the suspension means are of the same type as the suspension means 24, 28. They have a reduced non-linear behaviour and provide the translational guidance of the masses in the direction X. Nevertheless, they include two bars instead of four, they then have less rigidity. In a variant, the suspension means are formed by other types of spring, for example of the coil type.

The two masses M1, M2 are connected by a central beam 59. The central beam 59 is held rotationally by a hinge 61 formed by four orthogonal beams anchored at the centre of the gyroscope. The central beam 59 is driven by the masses M1, M2, when the latter move in an opposite manner in the direction X. Each of the longitudinal ends of the beam 59 is connected to a mass M1, M2 by flexible springs 63 linear in the direction Y, making it possible to absorb the movement of the decoupling frames, and stiff in the direction X, transmitting the movement of the masses M1, M2 to the central beam 59 and to the detection means described below. The central beam 59 also provides coupling of the masses M1, M2, which can move only symmetrically with respect to the rotation axis of the hinge 61.

Figure 4B:
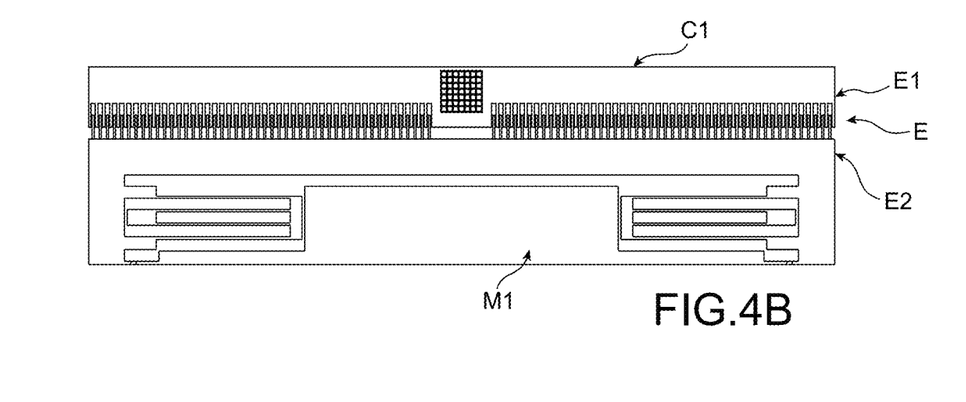
FIG. 4B is a plan view of means for exciting coupling frames, able to be used in the gyrometer of FIG. 4A.

The gyroscope also includes excitation means E configured to set in vibration the decoupling frames and the masses in a direction X or Y. In FIG. 4B, an example of these excitation means E can be seen. They include interdigitated combs E1, E2 forming electrodes, the comb E1 forming a fixed electrode and the comb E2 forming a movable electrode. Each frame C1, C2 includes excitation means.

The gyroscope also includes means D for detecting the movement of the masses and advantageously means for detecting the movement of the frames in the excitation direction.

Figure 4C:
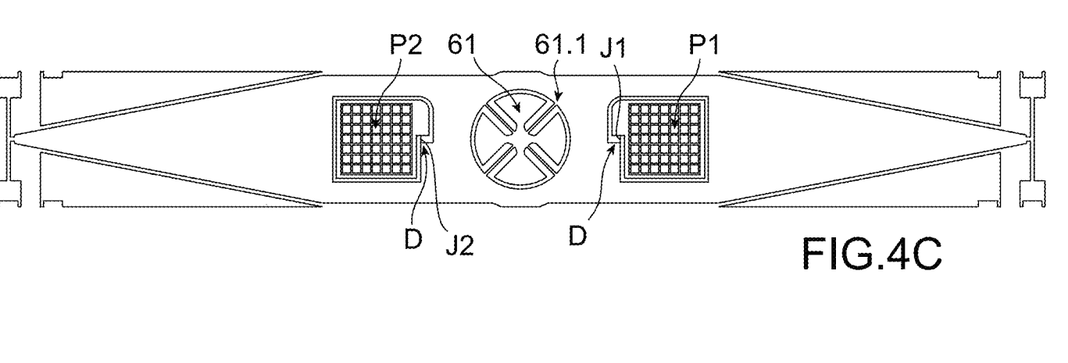
FIG. 4C is a plan view of means for detecting the movement of the masses that can be used in the gyrometer of FIG. 4A.

In FIG. 4C, an enlarged view of the beam 59 can be seen, showing an example of means D for detecting the movement of the masses. They include two strain gauges J1, J2 each suspended between the central beam 59 and an anchoring and electrical-connection stud P1, P2. The gauges J1, J2 are disposed on either side of the rotation axis so as to be stretched or compressed by the rotational movement of the central beam 59 due to the movement of the masses in the direction Y. The gauges are advantageously mounted so as to allow a differential measurement.

In a variant, the detection means are of the capacitive type.

An example of operation of the gyroscope will now be described.

It is wished to measure the rotation speed along the out-of-plane axis Z. The frames are excited in the direction X, they move with the masses.

Because of the coupling devices connecting the frames, the two frames C1, C2 move mainly in phase opposition, the in-phase movements being strongly prevented by the coupling device DC1, DC2.

Figure 5:
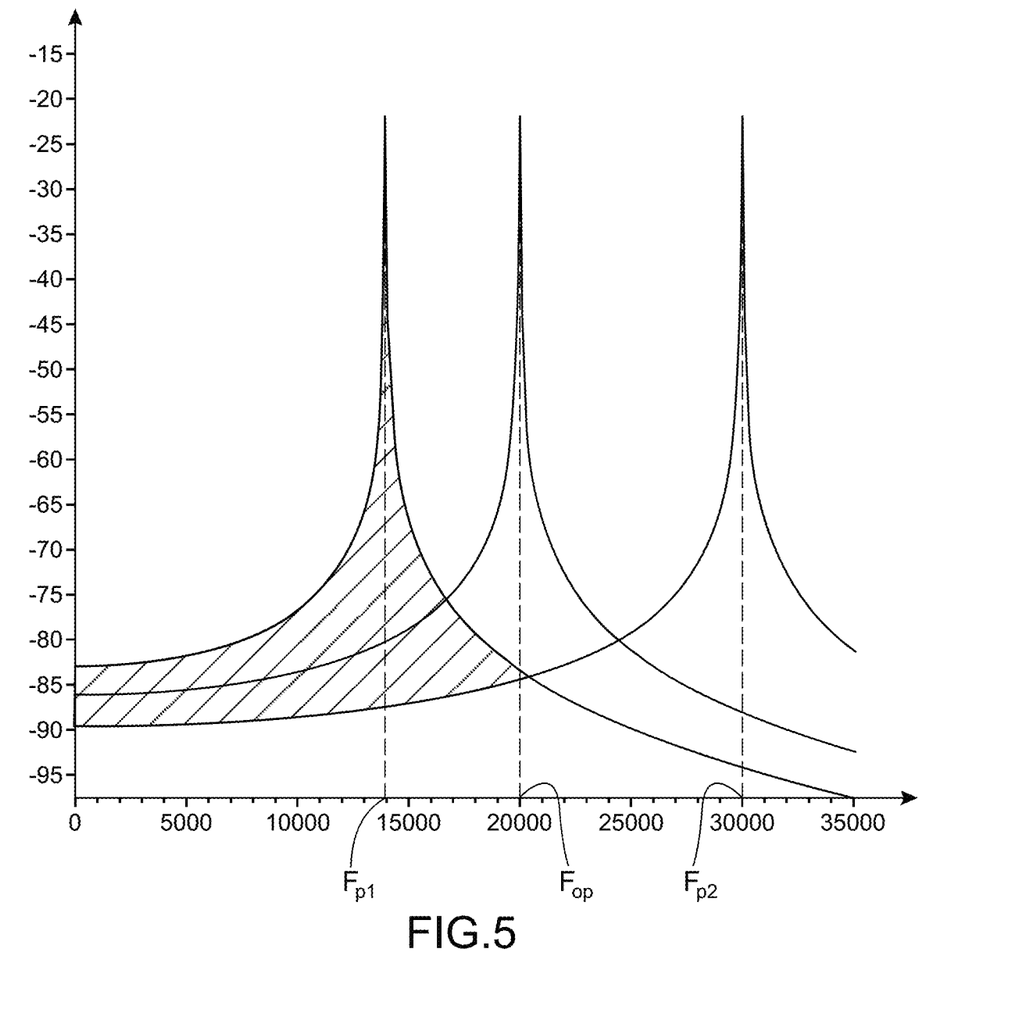
FIG. 5 is a graphical representation of the transfer functions of the decoupling frames in a non-coupled phase, in antiphase and in phase coupled by the coupling devices.

As a result the in-phase mode is rejected at a frequency higher than that of the phase-opposition mode, as shown in FIG. 5, which shows the transfer functions of the decoupling frames in non-coupled phase, in antiphase, in phase coupled by the coupling devices, i.e. the ratio of movement to excitation force as a function of its frequency.

Fp1 is the frequency of the in-phase mode of a gyrometer of the prior art, which is of the order of 14 kHz, fp2 is the frequency of the in-phase mode of the gyrometer with the coupling devices DC, which is of the order of 30 kHz, and fop is the frequency of the phase-opposition mode of the gyrometer, which is of the order of 20 kHz, this frequency being in this example kept constant during the use of the coupling devices.

The excitation mode in phase opposition occurs first at 20 kHz. The in-phase mode being rejected at higher frequency, it is less sensitive to disturbances, such as vibrations between 0 and 20 kHz.

Under the effect of the Coriolis forces related to the rotation about the axis Z, the masses move along the direction X. The movement of the masses is measured by the detection means. Because of the symmetry of the gyroscope, a differential structure is formed that makes it possible to be free from an acceleration or gravity.

By virtue of the coupling devices, the occurrence of an excitation mode in phase opposition is favoured.

Figure 6:
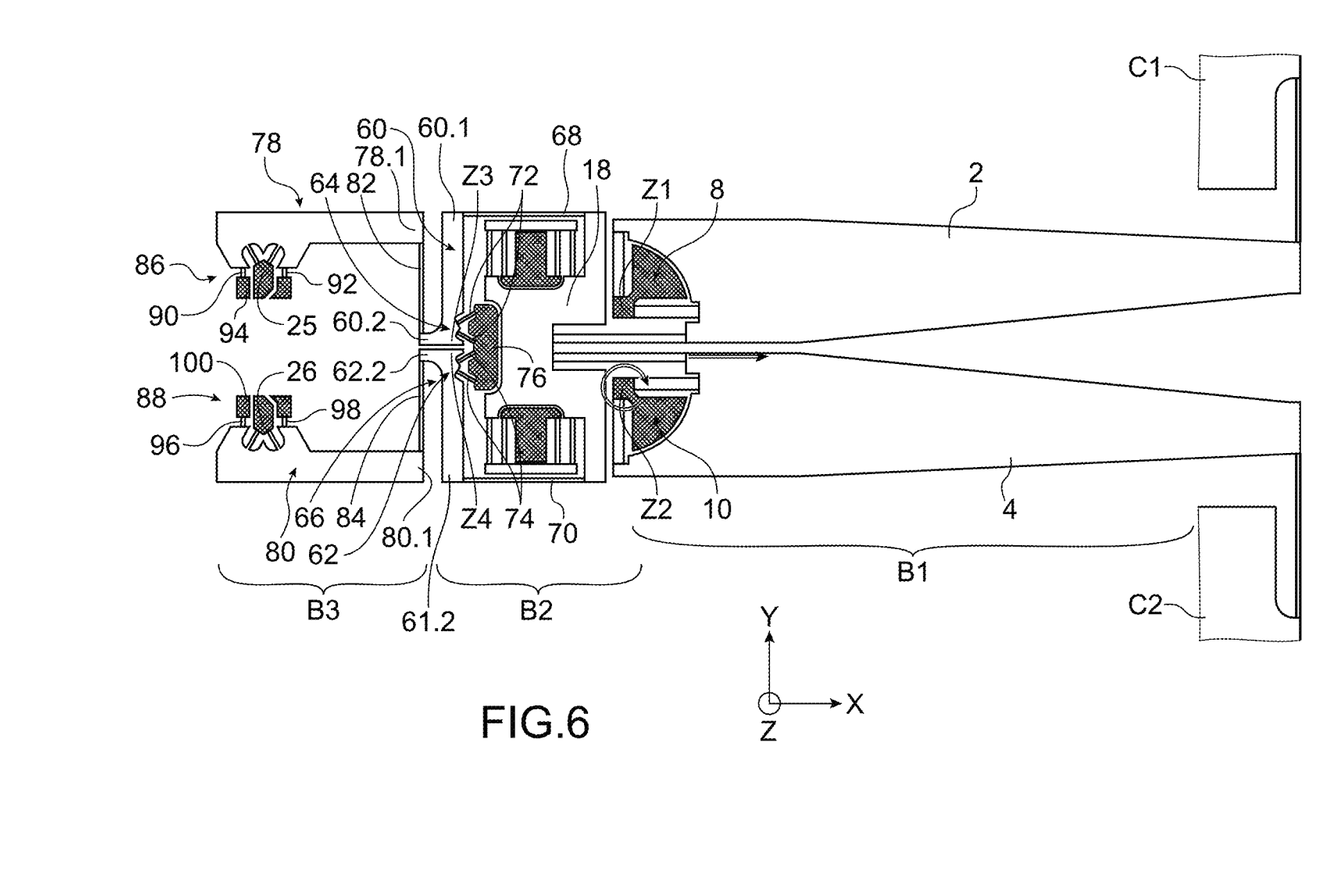
FIG. 6 is a partial plan view of another example of a gyrometer showing a coupling device and the movement measurement, wherein the coupling device participates in the measurement of the movement of the inertial masses.

In FIG. 6, an example embodiment that is particularly adapted to the use of means for detecting the movement of the strain-gauge frames, for example with a piezoresistive gauge, can be seen.

The movement of the frames is of the order of 10 μm, but the strain gauges are not able to withstand such a movement. The gauges are able to measure generally a movement of the order of 10 nm. For this purpose, detection means of the capacitive type are generally used, since these can directly measure large movements. For example, the capacitive detection means include a first comb formed in a face of the coupling element opposite to the one connected to the arms 2, 4 and a second comb carried by the support and interdigitated with the first comb.

It may be advantageous nevertheless to measure the movement of the frames by means of piezoresistive gauges. This is because piezoresistive gauges have a substantially smaller size compared with that of interdigitated combs. Furthermore, the means for detecting the movement of the masses generally use piezoresistive gauges, it is advantageous to use gauges both for measuring the movement of the frames and the movement of the masses, which makes it possible to be free from several defects such as the noise on the polarisation voltage, or the temperature drift to which the gauges are subject. This is because, since the gauges have the same defects, these cancel each other out when the ratio of the measurement of the movement of the masses to the measurement of the movement of the frames is calculated.

FIG. 6 shows an example embodiment of means for reducing the movement of the frames measured by the gauges.

The reduction means include several lever arms in series making it possible to sufficiently reduce the movement to be measured by the gauges.

In the example shown, three lever arms B1, B2, B3 are used.

Advantageously, each lever arm has symmetry with respect to the plane P because of the detection of the movement of the two frames C1, C2.

The first lever arm B1 is formed by the arms 2, 4 of the coupling device.

The second lever arm B2 includes two arms 60, 62 articulated in rotation on the support by pivot articulations 64, 66 of axis Z3, Z4 respectively. In the example shown, the two arms are aligned with each other and extend in the direction Y.

The two arms 60, 62 form $1^{st}$ class levers. Each arm 60, 62 includes a first longitudinal end 60.1, 62.1 mechanically connected to the carriage 18 by an element 68, 70 offering high rigidity in the direction X and a certain flexibility in the direction Y for harmonising the movements of the lever arm and of the carriage. The elements 68, 70 are for example beams extending along the direction X. In this example, the beams 68, 70 extend on either side of the carriage 18 and are connected to the carriage on the same side as the arms 2, 4. Each arm 60, 62 includes a second longitudinal end 60.2, 62.2 mechanically connected to the third lever arm, the pivot articulation of each arm 60, 62 being between their two ends.

This configuration makes it possible to have arms 60, 62 that are relatively long in the direction Y, which offer a high lever arm, and also makes it possible to reduce the size along the direction X, the beams 68, 70 extending along the carriage. In a variant, the arms 60, 62 are connected to the carriage on the face thereof located opposite the arms 2, 4.

In the example shown, the pivot articulations 64, 66 each include two beams 72, 74 able to deform by bending in the plane XY, the two beams being connected to an anchoring stud 76. In the example shown, the two pairs of beams 72, 74 are connected to the same anchoring stud 76. In a variant, separate anchoring studs for the two pairs of beams are used.

The third lever arm B3 includes two arms 78, 80 extending in the direction X and mechanically connected to the second longitudinal ends 60.2, 62.2 of the arms 60, 62 by elements 82, 84 offering high rigidity in the direction Y, and great flexibility in the direction X for harmonising the movements of the two lever arms. The elements 82, 84 are for example beams extending along the direction Y. In this example, the beams 82, 84 extend on either side of the movable element and are connected to the movable element on the same side as the arms 2, 4.

The arms 78, 80 of the lever arm 83 are rotationally articulated on the support by pivot articulations 86, 88 of axis Z5, Z6 respectively. The pivot articulations 86, 88 are similar to the pivot articulations 64, 66.

Two strain gauges 90, 92 are suspended between the arm 78 and the anchoring studs 94 on either side of the pivot articulation 86 and allow a differential measurement. Thus, when the arm 78 pivots, one of the gauges is compressed while the other one is stretched.

Two strain gauges 96, 98 are suspended between the arm 80 and the anchoring stud 100 of the pivot articulation 88 on either side of the articulation, allowing a differential measurement. Thus, when the arm 80 pivots, one of the gauges is compressed while the other one is stretched.

The operation of a gyrometer including such reduction means will now be described.

When the frames are excited in phase opposition, they move in translation along the direction Y, by a certain movement. The arms 2, 4 then pivot in phase opposition, causing a movement of the coupling element along the direction X. Because of the lever-arm effect resulting from the arms 2, 4, the movement of the movable element 18 along the direction X is reduced by the gain of the lever arm with respect to those of the frames C1, C2.

The movement of the movable element 18 causes the pivoting of the arms 60, 62 of the second lever arm. The axial movement of the second ends 60.1, 60.2 of the arms 60, 62 along the direction X is reduced by the gain of the lever arm formed by the arms 60, 62, with respect to the movement of the end 60.2, 62.2 in the direction Y, the movement of the end 60.1 being equal to or very close to the movement of the carriage 18.

The pivoting of the arms 60, 62 causes the pivoting of the arms 78, 80 about the pivot articulations 86, 88. The gauges are then deformed. The movement of the gauges is reduced by the gain of the lever arm of the arms 78, 80 with respect to the movement of the ends 78.1, 80.1 of the arms 78, 80 very close to the movement of the ends 60.2, 62.2 of the arms 60, 62.

Thus the ratio between the movement of the frames along the direction Y and the movement applied to the gauges is equal to the product of the lever-arm gains of the three lever arms B1, B2 and B3.

By way of example, considering that the gain of the first lever arm B1 is 30 and the gain of each of the lever arms is 6, the total gain is 1080. Thus, for a movement of the frames of around 10 µm, the gauges see a movement of around 9 nm, less than the 10 nm that they can measure.

Thus it is possible to use gauges for measuring the movement of the frames.

It will be understood that the number of lever arms in series is not limitative, two or more than three lever arms can be used, which each offer gains different from those stated above. The gains can be adjusted by modifying the dimensions of the arms.

Highly advantageously, the gauges for measuring the movement of the frames are disposed in proximity to the gauges for measuring the movement of the masses, i.e. at a distance of the order of a few tens of µm, thus they see the same temperatures. Furthermore, during manufacture advantageously by microelectronic methods, they are produced under the same conditions during lithography and etching steps.

In the example shown, a pair of gauges is used on each arm 78, 80, providing favourable mechanical symmetry to the operation of the whole. Furthermore, each pair allows a differential measurement.

It can be envisaged to not recover the signal on one of the pairs of gauges, this serving only to obtain mechanical symmetry.

In a variant, a single gauge on each arm can be used instead of two.

Finally, a system including only one pair of gauges or one gauge on one of the arms does not depart from the scope of the present invention.

A system including only one arm 60 and one arm 78 does not depart from the scope of the present invention.

The use of a plurality of lever arms in series makes it possible to properly control the reduction ratio, and in fact the gain of the lever arms is geometric. The gain of each lever arm varies very little according to the etching imperfections. The apparent stiffness may vary but not the movement ratio between the input of the arm and the output of the arm.

The same reduction system can be used for the other coupling device.

In a variant, in order to reduce the movement seen by the gauges, a device as described in the patent EP 3 136 052 can be used. Nevertheless, the reduction ratio is less well controlled.

A gyrometer wherein the lever arms in series are used between the masses and the gauges for measuring the movement of the masses does not depart from the scope of the present invention.

The elements the movements of which are made symmetrical by the coupling device may be able to rotate about an axis normal to the plane XY. The coupling device then requires the two elements to pivot in opposite directions.

The coupling device according to the invention and the gyrometer including such coupling devices can highly advantageously be produced by methods used in the microelectronic field.

The invention claimed is:

1. A mechanical coupling device to couple two movable elements able to move in a first plane, so as to impose thereon symmetrical movements with respect to a second plane normal to the first plane, said coupling device comprising two arms each articulated on a support by a pivot connection about a first direction, said first direction being out-of-plane relative to said first plane, one of the arms to be connected to one of said two movable elements and the other arm to be connected to another one of said two movable elements by first elements having high rigidity in a second direction of the first plane, a coupling element to which the two arms are connected by second elements having high rigidity in a third direction of the first plane distinct from the second direction, said coupling element being configured to move in translation along the third direction, at least one suspension device for suspending said coupling element from the support, said at least one suspension device being configured for guiding the coupling element in translation along the third direction and limiting its movement in rotation about the first direction.

2. The mechanical coupling device according to claim 1, wherein the first elements include blades rigid under compression in the second direction and flexible in the third direction, and wherein the second elements include blades rigid under compression in the third direction and flexible in bending in the second direction.

3. The mechanical coupling device according to claim 1, wherein, along the third direction, the coupling element includes two lateral edges, and wherein the at least one suspension device includes four elements, two elements on either side of the coupling element with respect to the third direction, each of said two elements on either side of said coupling being disposed at an end of a lateral edge with regard to the third direction.

4. A coupling device according to claim 3, wherein each of said two elements on either side of said coupling includes a first beam and a second beam parallel to each other, each first and second beam being able to deform under bending in the third direction and being rigid under compression in the second direction, and wherein the first beam includes a first longitudinal end attached to the coupling element and a second longitudinal end attached to a connection element extending in the third direction, the second beam includes a first longitudinal end attached to an anchoring stud and a second longitudinal end attached to said connection element, and wherein the connection element is common to the two elements connected to a same lateral edge of the coupling element.

5. The coupling device according to claim 1, wherein the arms are not deformable, or only slightly deformable, under bending in the second direction.

6. A gyrometer comprising a support, two decoupling frames suspended from the support so as to be able to move in translation in the second direction, a mass suspended from each decoupling frame, so as to be able to move in translation in the third direction, at least one coupling device according to claim 1, wherein the two decoupling frames are mechanically connected and moving in phase opposition in the second direction, at least one exciting device for exciting the decoupling frames in the second direction and at least one first detector for detecting the movement of the masses in the third direction.

7. The gyrometer according to claim 6, comprising two coupling devices, and wherein each decoupling frame is in the general form of a U, the two decoupling frames being disposed so that ends of the arms of the U are aligned, and wherein each coupling device connects two aligned ends of the two decoupling frames.

8. The gyrometer according to claim 7, wherein each arm of one of the coupling devices is connected to a free end of one of the decoupling frames by a beam extending in the second direction.

9. The gyrometer according to claim 6, comprising at least one second detector for detecting the movement of the decoupling frames in the second direction, and wherein said at least one second detector includes at least one strain gauge sensitive to the movement of one of the movable elements.

10. The gyrometer according to claim 9, comprising at least one reduction device for reducing the movement of the movable element.

11. The gyrometer according to claim 10, wherein the at least one reduction device includes at least one lever arm in series with the arms of at least one coupling device.

12. The gyrometer according to claim 11, wherein the lever arm includes two arms rotationally articulated on the support and comprising an end connected to the coupling element, said arms extending in the second direction and being located opposite the arms of the coupling device with respect to the coupling element.

13. The gyrometer according to claim 12, comprising at least one other lever arm including two arms rotationally articulated on the support, each connected by one end to an arm of the lever arm and connected by another end to the strain gauge.

14. The gyrometer according to claim 6, comprising at least one second detector for detecting the movement of the decoupling frames in the second direction, and wherein said at least one second detector includes at least one strain gauge sensitive to the movement of one of the movable elements, and wherein the at least one first detector includes at least one strain gauge and wherein said strain gauge and the at least one strain gauge of the at least one second detector are located in proximity to each other.

* * * * *